(12) United States Patent
Hall, Jr. et al.

(10) Patent No.: US 11,506,214 B2
(45) Date of Patent: Nov. 22, 2022

(54) COOLING FAN MONITORING CIRCUIT

(71) Applicant: WINSTON INDUSTRIES, LLC, Louisville, KY (US)

(72) Inventors: Lloyd Dennis Hall, Jr., Taylorsville, KY (US); Robert Scott Gasser, Louisville, KY (US); Wesley Alden Kleier, Louisville, KY (US); Bobby Douglas Hayes, Louisville, KY (US)

(73) Assignee: Winston Industries, LLC, Louisville, KY (US)

( * ) Notice: Subject to any disclaimer, the term of this patent is extended or adjusted under 35 U.S.C. 154(b) by 199 days.

(21) Appl. No.: 16/808,709

(22) Filed: Mar. 4, 2020

(65) Prior Publication Data

US 2020/0332803 A1    Oct. 22, 2020

Related U.S. Application Data

(60) Provisional application No. 62/835,492, filed on Apr. 17, 2019.

(51) Int. Cl.
*F04D 27/00*    (2006.01)
*G01P 3/44*    (2006.01)

(52) U.S. Cl.
CPC ......... *F04D 27/001* (2013.01); *F04D 27/008* (2013.01); *G01P 3/44* (2013.01)

(58) Field of Classification Search
CPC ......... F04D 27/001; F04D 27/008; G01P 3/44
See application file for complete search history.

(56) References Cited

U.S. PATENT DOCUMENTS

2003/0193307 A1*  10/2003  Burstein ............... F04D 27/008
                                                                      318/473

* cited by examiner

*Primary Examiner* — Manuel A Rivera Vargas
(74) *Attorney, Agent, or Firm* — Carrithers Law Office, PLLC; David W. Carrithers

(57) ABSTRACT

A cooling fan monitoring circuit for monitoring and immediately alerting the user of the activation of a cooling fan motor and blade assembly providing notice of the shutting down of equipment requiring cooling to prevent overheating and damage to the equipment. The circuit is capable of monitoring multiple cooling fans and shuts down equipment if any one of the cooling fans ceases function, fails a preset condition, or the equipment reaches a preset temperature.

15 Claims, 4 Drawing Sheets

COOLING FAN MONITORING CIRCUIT

CROSS REFERENCE TO RELATED APPLICATIONS

This application claims priority from U.S. Provisional Application Ser. No. 62/835,492 filed on Apr. 17, 2019 and is incorporated herein in its entirety.

TECHNICAL FIELD

The present invention relates to the field of cooling fan monitoring devices which are capable of disabling selected other circuits in case of a cooling fan failure.

BACKGROUND OF THE INVENTION

Many types of commercial and industrial equipment have cooling fans which are used to keep electronic circuitry cool during operation. When a cooling fan fails, the electronic circuitry is in danger of overheating causing damage to the electronic circuitry and potentially the system the electronic circuit is controlling. Accordingly, such electronic circuitry should be protected. In the event of a cooling fan failure therefore it may be necessary to generate one or more alarms and for portions of the equipment to be shut down.

However, prior art safety circuits monitoring such situations are often dependent on a temperature sensing device, such as a thermostat, which is used to trigger an alarm and shut down a selected portion of the equipment. Such thermostats are themselves susceptible to failure as well wherein such a failure leaves the equipment providing the required services in danger of major expensive failures should the cooling fan or fans cooling the electronic circuitry and/or equipment fail. In other situations the operation of a cooling fan must be ensured in order to meet regulatory requirements for some classes of equipment, e.g. those within the food industry.

Accordingly, it would be beneficial to provide a monitoring system which monitors the cooling fan(s) and can trigger an alarm and/or shut down predetermined portions of the equipment the cooling fan(s) are associated with.

SUMMARY OF THE INVENTION

Many types of commercial and industrial equipment have cooling fans which are used to keep electronic circuitry cool during operation. When a cooling fan fails, the electronic circuitry is in danger of overheating causing damage to the electronic circuitry and potentially the system the electronic circuit is controlling. Accordingly, such electronic circuitry should be protected. In the event of a cooling fan failure therefore it may be necessary to generate one or more alarms and for portions of the equipment to be shut down.

However, prior art safety circuits monitoring such situations are often dependent on a temperature sensing device, such as a thermostat, which is used to trigger an alarm and shut down a selected portion of the equipment. Such thermostats are themselves susceptible to failure as well wherein such a failure leaves the equipment providing the required services in danger of major expensive failures should the cooling fan or fans cooling the electronic circuitry and/or equipment fail. In other situations the operation of a cooling fan must be ensured in order to meet regulatory requirements for some classes of equipment, e.g. those within the food industry.

Accordingly, it would be beneficial to provide a monitoring system which monitors the cooling fan(s) and can trigger an alarm and/or shut down predetermined portions of the equipment the cooling fan(s) are associated with.

SUMMARY OF THE INVENTION

Modern standard such as UL, CUL, and CSA standards require that where a cooling fan is used to keep electronic components cool in food service appliances, the fan operation must be guaranteed. In the case of fan-failure, the equipment responsible for heating the cabinet must be shut down to ensure that an over-temperature condition does not occur.

According to an embodiment of the invention a fan detection circuit uses a square-wave tach-output of a moving fan to enable a relay. In the case of fan failure, the square-wave tach-output will disappear thereby disabling the relay. If this relay is within the power supply to heat producing equipment then this will disable the heat producing equipment attached to the power supply. The removal of the square-wave tach-output can also be employed to trigger an alarm and/or notification of a problem with the equipment.

An embodiment of the invention with two fan tach inputs allows for a pair of fan square-wave tach-outputs to control the relay output. Both fans must be functional for the relay to stay enabled. If either fan's tach-output signal disappears, the relay will be disabled. In the case where only one fan is used, it must be plugged into both inputs. Embodiments of the invention can be extended to support 3, 4, 5, or more fans as would be evident to one of skill in the art to which the invention relates.

This invention offers true detection of cooling fan failure immediately as it happens. This improves on the use of thermal limit thermostats that are prone to nuisance tripping and allowing undesired heat buildup inside the protected compartment.

In accordance with the present invention, there is provided a cooling fan monitoring circuit comprising or consisting essentially of a tach generator contained within a given cooling fan, an AC coupled tach input detection circuit, a timing circuit, and a relay drive circuit, and given electronic control circuitry controlling a given piece of equipment, with the electronic control circuitry capable of being enabled or disabled by the relay drive circuit. The AC coupled tach input detection circuit outputs a low pulse to an input of the timing circuit for every tach pulse where tach pulses are only generated by rotation of the fan. The timing circuit outputs a high voltage level when the low pulses from the AC coupled tach input detection circuit occur at a selected frequency. The high voltage level causes the relay control circuit to enable an output relay thus enabling the electronic control circuitry. On the other hand, the AC coupled tach input detection circuit outputs a high voltage level to the input of the timing circuit when no tach pulses are input to the AC coupled tach input detection circuit. The timing circuit outputs a low voltage level when the low pulses from the AC coupled tach input detection circuit occur below a selected frequency, and the low voltage level output from the timing circuit causes the relay control circuit to disable the output relay, thus disabling the electronic control circuitry.

It would be evident that within other embodiments of the invention the timing circuit may be implemented such that the selected frequency at which the low pulses from the AC coupled tach input detection result in the timing circuit outputting a high voltage level may be variable under control of a fan speed portion of an overall electronic circuit associated with the cooling fan such that failure of variable speed fans may also be established. Accordingly, the selected frequency may be predetermined, for example 50 Hz or 60 Hz, or variable.

More particularly, an embodiment of the instant invention includes a monitoring circuit for a fan comprising or consisting of a tach generator contained within a given cooling fan, an AC coupled Tach input detection circuit, a timing circuit, and a relay drive circuit, and given electronic control circuitry controlling a given piece of equipment. The electronic control circuitry is capable of being enabled or disabled by the relay drive circuit. The AC coupled tach input detection circuit outputs a low pulse to an input of the Timing circuit for every tach pulse. The timing circuit outputs a high voltage level when the low pulses from the AC coupled tach input detection circuit occur at a selected frequency, and the high voltage level causes the relay control circuit to enable an output relay enabling the electronic control circuitry. The AC is coupled to tach input detection circuit outputting a high voltage level to an input of the timing circuit when no tach pulses are input to the AC coupled Tach input detection circuit. The timing circuit outputs a low voltage level when the low pulses from the AC coupled tach input detection circuit occur below a selected frequency. The low voltage level output from the timing circuit causes the relay control circuit to disable the output relay, and the output relay then disables the electronic control circuitry.

A method for monitoring operation of a fan comprises or consists of the steps of providing a monitoring circuit for determining operation of the fan at either a predetermined frequency or within a predetermined range of the predetermined frequency, and generating a first output from the monitoring circuit when the operation of the fan is either at the predetermined frequency or within the predetermined range of the predetermined frequency. A second output is generated from the monitoring circuit when the operation of the fan is either not at the predetermined frequency or not within the predetermined range of the predetermined frequency. The monitoring circuit comprises or consists of providing an input detection circuit for coupling to a tach generator associated with the fan and for receiving a pulsed input signal from the tach generator generated in dependence upon rotation of the fan. A timing circuit is provided for processing an output of the input detection circuit wherein an output of the time circuit is established in dependence upon an aspect of operation of the fan. A drive circuit is provided for generating an output in dependence upon the output of the timing circuit. The input detection circuit is AC coupled thereto and outputs a low pulse to the input of the timing circuit for every tach pulse received from the tach generator and the timing circuit outputs a first output level when the low pulses from the input detection circuit occur at a predetermined frequency and the first output level from the timing circuit generates a first output from the drive circuit. The input detection circuit outputs a high voltage level to the input of the timing circuit when no tach pulses received from the tach generator and the timing circuit outputs a second output level low when either no tach pulses are received from the tach generator or the tach pulses received from the tach generator are at a frequency below the predetermined frequency and the second output level from the timing circuit generates a second output from the drive circuit.

It is an object of this invention to provide protection for equipment controlled by electronic circuitry wherein the electronic circuitry requires one or more cooling fans to prevent the overheating and failure of the electronic circuitry.

It is an object of this invention to provide protection for equipment controlled by electronic circuits which depend on cooling fans by monitoring the motion of such cooling fans and providing for de-energizing of some or all of such equipment when a cooling fan fails.

It is an object of this invention to provide protection for equipment controlled by electronics which depend on cooling fans by providing a circuit which can monitor one or more fans simultaneously and can shut down selected equipment when a cooling fan fails.

It is an object of this invention to provide protection for equipment controlled by electronics which depend on cooling fans wherein the fan monitoring circuit monitors the actual motion of the fan by monitoring a tach signal coming from the fan or fans cooling the equipment.

Whilst embodiments of the invention are described with respect to powering off portions of an electronic circuit and/or equipment upon failure of the fan it would also be evident that the circuit according to an embodiment of the invention can also provide for verification of correct fan operation and that variations in the described embodiments of the invention may provide for determination of variances and provide, potentially, early warning indication for preventative maintenance, fan replacement etc. prior to actual failure.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
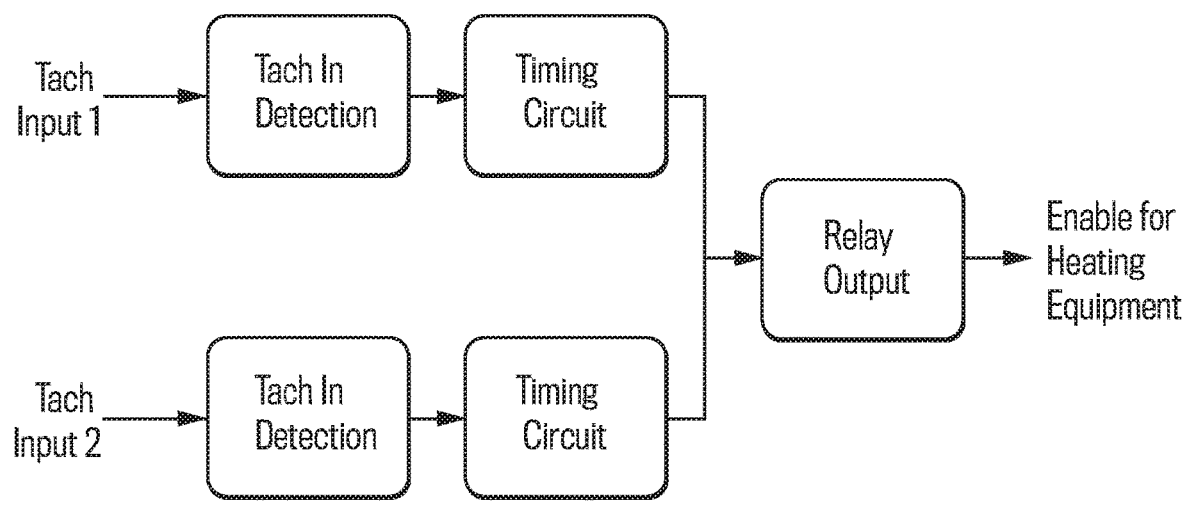
FIG. 1 is a block diagram showing an overview of the fan detection circuitry.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. As used herein, the term "about" can be reasonably appreciated by a person skilled in the art to denote somewhat above or somewhat below the stated numerical value, to within a range of ±10%.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with the FIGS. 1-10, there is provided a cooling fan monitoring circuit which uses tach pulses from the cooling fan to energize an out relay when the cooling fan is running.

A block diagram of the cooling fan monitoring circuit is shown in FIG. 1 and illustrates an embodiment of the invention for dual fans providing the inputs tach input 1 and Tach Input 2 or a single fan connected to both tach input 1 and tach input 2 thereby allowing more than one cooling fan to be monitored by the cooling fan monitoring circuit. In this case, one or two cooling fans can be monitored although it would be evident that this circuit may be expanded for 3 or more fans through separate tach in detection circuits for each cooling fan or by providing additional logic such that each tach in detection circuit is periodically coupled to each fan within the equipment.

Figure 4:
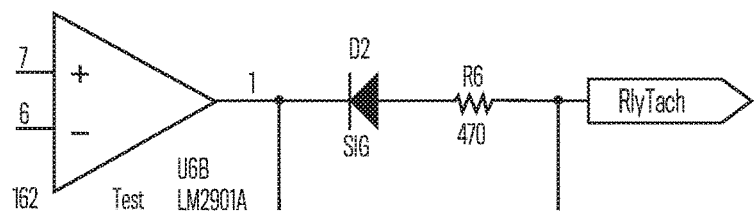
FIG. 4 is the timing circuit output diagram.
Figure 5:
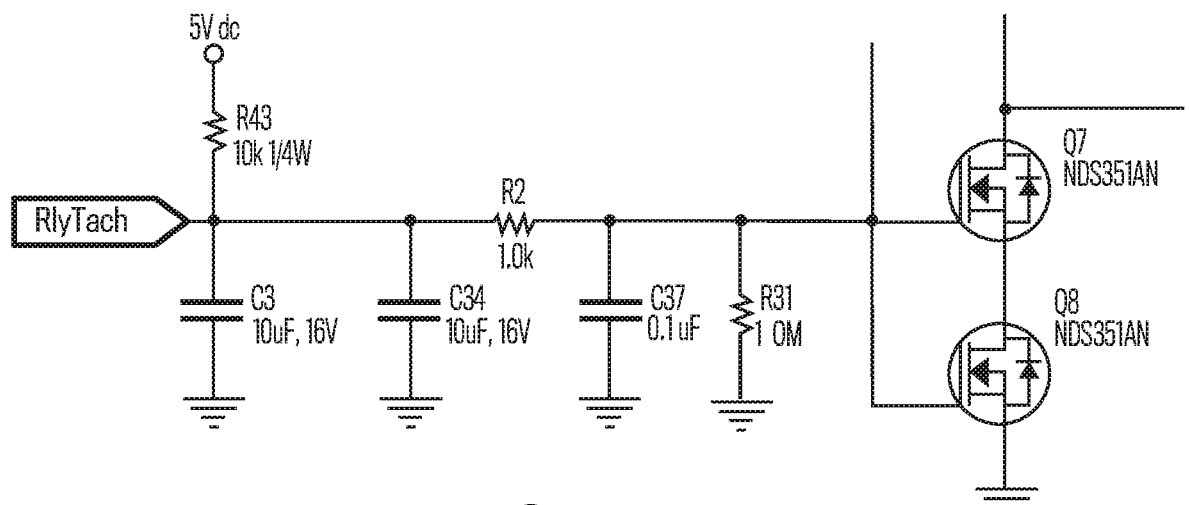
FIG. 5 is the relay drive output circuit.
Figure 6:
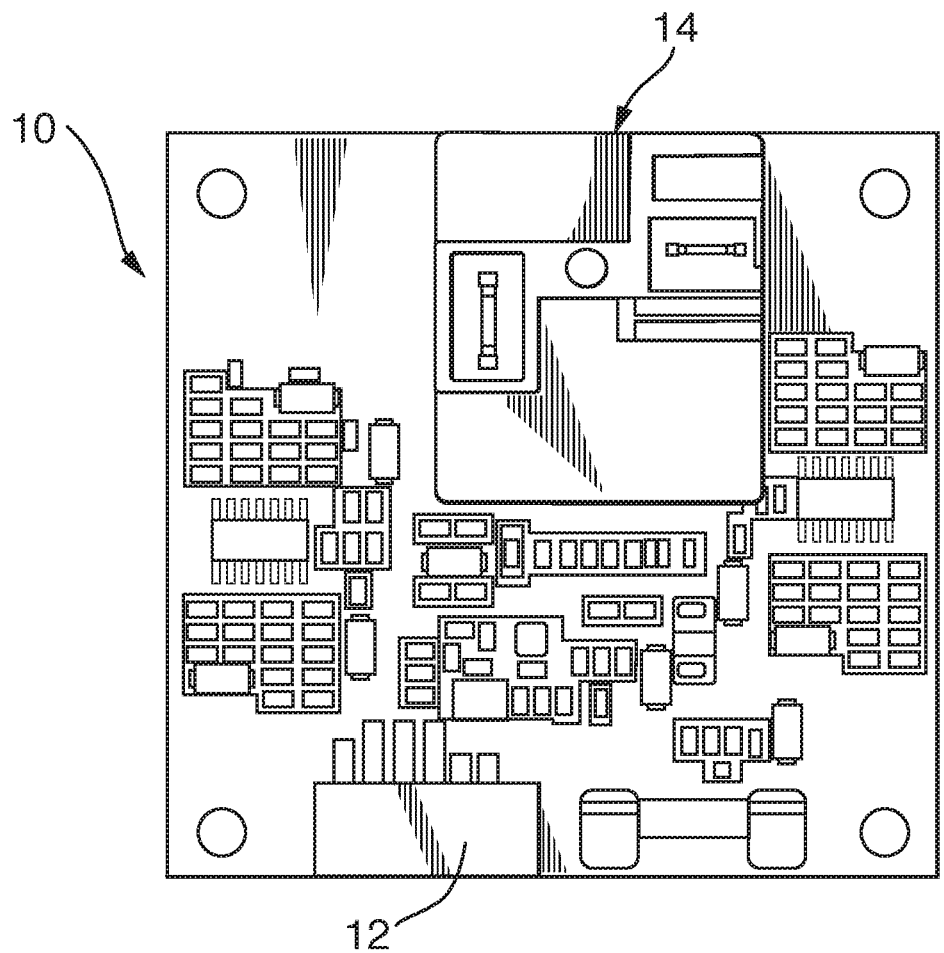
FIG. 6 is a front view of the circuit board containing the circuits of FIGS. 2-5.
Figure 7:
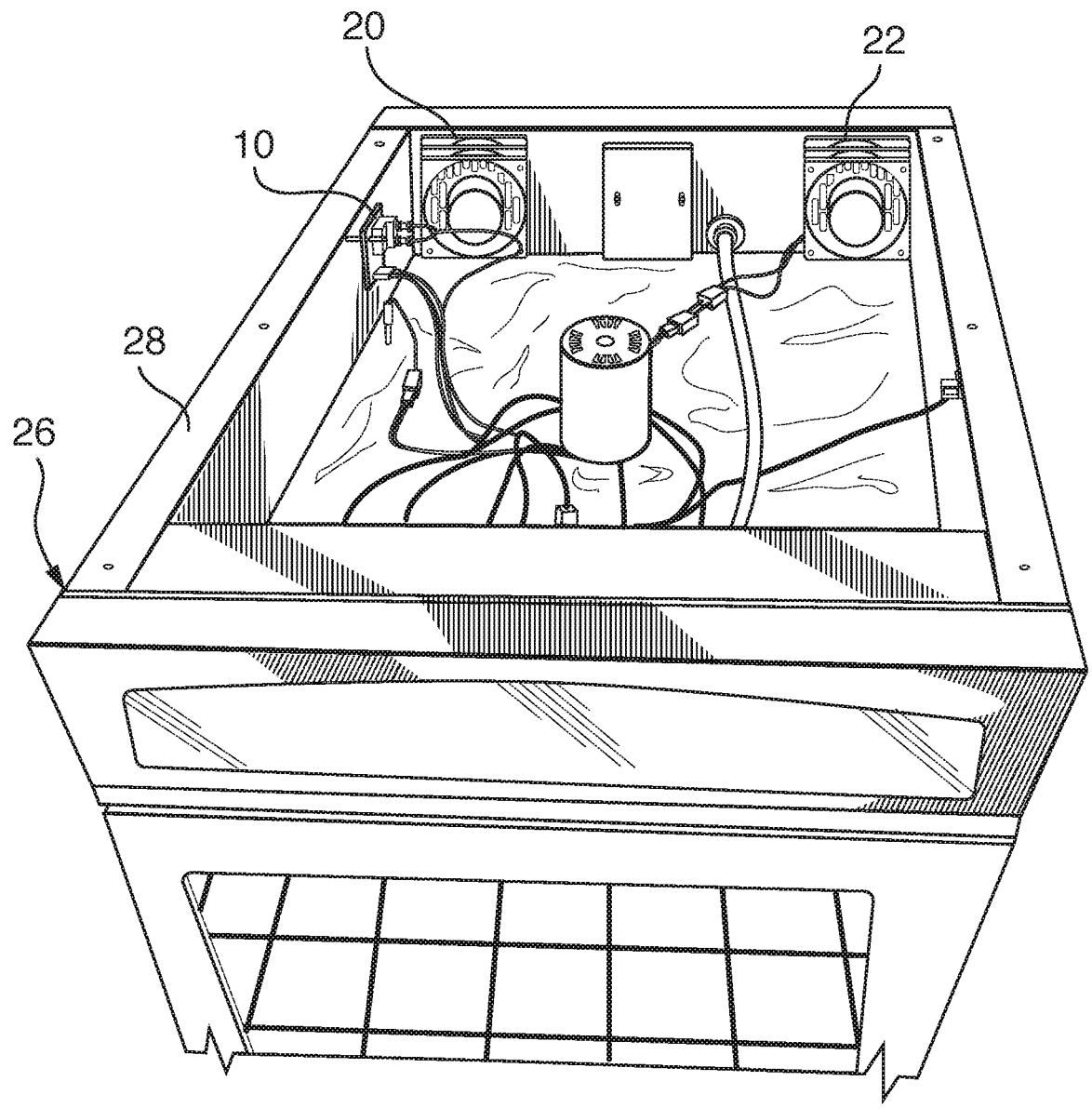
FIG. 7 is a top perspective view of a food service appliance showing cooling fans, the cooling fan monitoring circuit, electrical connections, circuit board and message display panel on the front of the appliances.

The circuit board 10 containing all of the circuitry in FIGS. 2-5 is shown in FIG. 6. Also included on the circuit board 10 are the relay output pins 12 and an input jack 14 with connection pins for the tach signals coming from the two fans. FIG. 7 shows a food heating unit 26 with two cooling fans 20 and 22. The electronic circuitry being protected by the cooling fans is under the top panel 28 of the heating unit 26. The cooling fan monitoring circuit board 10 is shown just in front of the cooling fan 22. A top lid (not shown) normally covers the area including the cooling fans 20 and 22, the cooling fan monitor board 10, and the electronic control circuitry.

A cooling fan includes a tach generator which creates a tach signal which is a pulse train present whenever the fan blade is turning. The pulse frequency is higher when the fan turns faster, and no pulses are present when the fan is not turning. Therefore, a pulse train is a positive indicator that the fan blade is turning.

Figure 2:
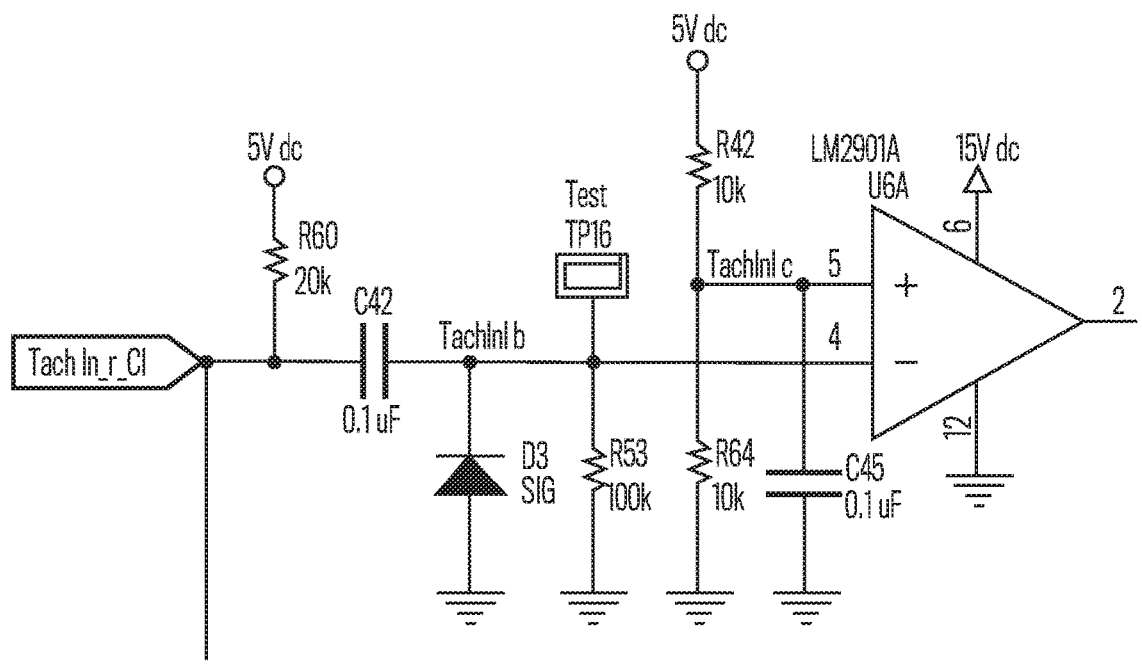
FIG. 2 is the tach input detection circuit diagram.
Figure 3:
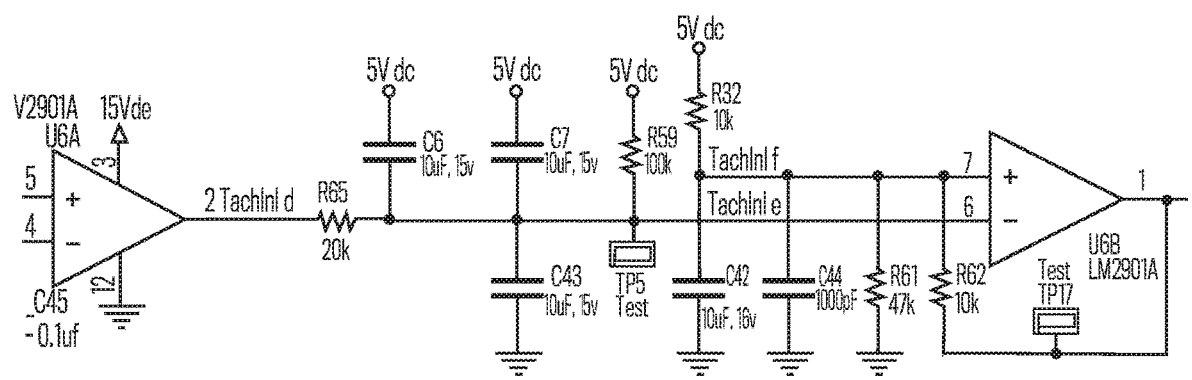
FIG. 3 is the timing circuit diagram.

The tach input detection circuit of FIG. 2 uses AC coupling to detect a pulse train generated by a fan. The tach input 1 pulses come from the tach output signal generated by the cooling fan as it is running Because of the AC coupling, the tach input 1 signal must keep pulsing to keep the relay enabled. A straight high or low will not enable the relay. FIG. 2 details the circuit. When a low to high transition is present at the input, this pulse will pass through C42 and be present at the comparator input at pin 4. If this is higher than the threshold at pin 5, the comparator output will be low for a brief period of time. The purposes of the following components are explained:

R60 provides pull-up for open collector fan tach outputs
C42 provides ac coupling
D9 is for reverse polarity protection
R63 is used to keep the comparator input at 0V.
R42, R64 and C45 set the threshold for change on the output The timing circuit of FIG. 3 directly follows the output of the tach input circuit of FIG. 2. It provides the ability to set the number of pulses that enable the relay, and it sets the amount of time pulses may not be present before the relay is again disabled. FIG. 3 details the circuit. This circuit uses the charge amount on a capacitor to control timing. As the input pulses pull the first comparator output low, the capacitor discharges at a high rate due to the low resistance of R65. When no pulses are present, the capacitor charges at a slow rate due to the high resistance of R59. Therefore, R65 determines the input frequency required to enable the output relay and R59 determines how long the tach pulses much be gone before the output relay drops out. A separate comparator with another threshold is used to output high when the capacitor has discharged a sufficient amount. The purposes of the following components are explained:

C43 is the holdup capacitance used for timing
C6 and C7 work with C43 capacitance, but they also guarantee a starting charge on C43 that is higher than the comparator threshold.
R65 sets how much cap discharge during pulses
R59 sets how much cap charge between pulses R32, R61, C4 and C44 set the threshold level for high output when there is sufficient discharge.

R62 provides hysteresis on the output

It would be evident therefore that R65, which determines the input frequency required to enable the output relay, and R59, which determines how long the tach pulses much be gone before the output relay drops out, may individually be replaced with a variable resistor allowing their respective functions to be adjusted, controlled or set.

This relay output circuit of FIG. 5 simply drives the output relay. Multiple timing circuits coming from different tach circuits are connected to a single relay drive. All timing circuits must give a high signal (showing fan is present) for the relay to be enabled. If any timing circuit shows no fan, the relay will be disabled. FIG. 4 shows a blocking diode D2 in series with the output U6B pin 1 then connected through R6 to create the signal RLYTACH The signal is the output of the timing circuit output monitoring the first tach.

FIG. 5 shows the relay drive input where all the timing circuits combine. There is only one Relay drive Input on this control. If none of the timing circuits are pulling low, R43 will pull the MOSFET gate high and drive the relay. The purposes of the following components are explained:

D2 provides safety protection for if there happens to be 15 Vdc present on pin 1 of the comparator;

R6 provides additional series resistance to reduce the drive capability of a single comparator output;

R43 is the component that will enable the relay when all timing circuits are go;

C3 and C34 provide additional timing and filtering on the output; and

Q7 and Q8 drive the coil of the relay.

As shown in FIG. 1, multiple tach signals from multiple cooling fans (in this case, there are two fans and therefore two tach input signals) are inputs to separate tach in detection circuits and timing circuits. The outputs of the separate timing circuits are tied together and are then connected to the junction of R43 and C3 in FIG. 5. If the outputs at U6B pin 1 of both timing circuits are high (mean both cooling fan tach signals are pulsing), then R43 will keep C3 charged and the relay output is enabled. If either one of the timing circuits output is low, (meaning the tach associated with that timing circuit is not pulsing), then the voltage at the junction of R43 and C3 is a low and the relay output is disabled. This causes selected equipment to be de-energized and thus protecting equipment.

Electronic circuitry protected by the cooling fan monitoring circuit of the present invention may be used to control heating ovens, as shown in FIG. 7, but may be used in any of hundreds of examples in commerce and industry where such control circuitry may be in danger of over heating. Examples such as HVAC equipment, refrigeration, computer systems, commercial kitchens, industrial control systems and the like are just a few of the many situations where cooling fans are critical to the proper running of electronic control circuitry and must therefore be monitored for failure.

It is anticipated that any number of cooling fans can be monitored by the present invention. With reference to FIG. 1, only one relay output circuit is needed but there must be a tach in detection circuit and a respective timing circuit associated with and connected to each cooling fan tach signal. All of the outputs from the timing circuits will be tied together at the input node of the relay output circuit. If any of the cooling fans fails, that fan's tach signal will stop pulsing and the respective tach in detector and timing circuits will cause the relay output to disable the equipment.

However, it would be evident that the tach in detection circuits and their respective timing circuits for multiple fans may also be coupled to multiple relay output circuits either to provide redundancy or control multiple sections of the equipment to which the cooling fans are associated. However, it would also be evident that different subsets of multiple tach in detection circuits and their respective timing circuits may also be coupled to different relay output Circuits.

Whilst within the preceding description the embodiments of the invention have been described with respect to cooling fans it would be evident that these embodiments of the invention may also be employed with other fans including those, for example, providing airflow in conjunction with a heater or within equipment without cooling or heating.

Whilst within the preceding description the embodiments of the invention have been described albeit implicitly with respect to continuous fan operation it would be evident that the embodiments of the invention in conjunction with additional circuits and/or logic may also provide control and/or alarms with periodic fan operation or to provide verification of fan operation when a fan is engaged.

Within the preceding description the embodiments of the invention have been described with respect to a relay for removing power to a section of equipment in the event of a fan failure it would be evident that the resulting control state of the relay output circuit(s) or the tach in detection circuits and their respective timing circuits may be employed to generate one or more alarms including, but not limited to, a visual alarm, an audible alarm, an alarm communicated to a remote monitoring station, an alarm communicated to a service enterprise, an alarm communicated to a specific individual or role within an enterprise associated with the equipment being monitored etc. Such communicated alarms may be via wired and/or wireless interfaces of the monitoring circuit and/or equipment as would be evident to one of skill in the art.

Within the preceding description the embodiments of the invention have been described with respect to a relay for controlling a portion or portions of equipment associated with the fan. However, it would be evident that within other embodiments of the invention the relay drive circuit may be an output circuit providing one or more control signals to other portions of the equipment where these control signals may be, for example, directly employed as with the instance of a relay for example or processed by one or more subsequent analog and/or digital circuits to trigger one or more actions such as powering down portions of the equipment, triggering an alarm, triggering a communication, etc.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

We claim:

1. A monitoring circuit for a fan comprising:
  an input detection circuit for coupling to a tach generator associated with the fan and for receiving a pulsed input signal from the tach generator generated in dependence upon rotation of the fan;

a timing circuit for processing an output of the input detection circuit wherein an output of the time circuit is established in dependence upon an aspect of operation of the fan;

a drive circuit for generating an output in dependence upon the output of the timing circuit;

wherein the input detection circuit is AC coupled; wherein the input detection circuit outputs a low pulse to the input of the timing circuit for every tach pulse received from the tach generator and the timing circuit outputs a first output level when said low pulses from the input detection circuit occur at a predetermined frequency and the first output level from the timing circuit generates a first output from the drive circuit; and the input detection circuit outputs a high voltage level to the input of the timing circuit when no tach pulses received from the tach generator and the timing circuit outputs a second output level low when either no tach pulses are received from the tach generator or the tach pulses received from the tach generator are at a frequency below the predetermined frequency and the second output level from the timing circuit generates a second output from the drive circuit.

2. The monitoring circuit for the fan according to claim 1, wherein the aspect of operation of the fan is either rotation of the fan or rotation of the fan within a predetermined range of an operation frequency of the fan; and the operation frequency of the fan is either predetermined or variable.

3. The monitoring circuit for the fan according to claim 1, wherein the drive circuit controls whether electrical control circuitry controlling a portion of an item of equipment associated with the fan is enabled or disabled.

4. The monitoring circuit for the fan according to claim 1, wherein the input detection circuit is AC coupled; and the input detection circuit generates a low output pulse for each pulse received from the tach generator.

5. The monitoring circuit for the fan according to claim 1, wherein the input detection circuit generates an output pulse for each pulse received from the tach generator;

the timing circuit generates a predetermined output level when the output pulses from the input detection circuit occur at a predetermined frequency or within a predetermined range around the predetermined frequency; and the predetermined frequency is either predetermined or variable.

6. The monitoring circuit for the fan according to claim 1, wherein the first output is an output signal for enabling one or more relays such that they close; and the second output is an output signal for disabling the one or more relays such that they open.

7. The monitoring circuit for the fan according to claim 1, wherein the second output triggers at least one of an alarm and an electronic communication.

8. A method for monitoring operation of a fan, comprising:

providing a monitoring circuit comprising providing an input detection circuit for coupling to a tach generator associated with the fan and for receiving a pulsed input signal from the tach generator generated in dependence upon rotation of the fan, providing a timing circuit for processing an output of the input detection circuit wherein an output of the time circuit is established in dependence upon an aspect of operation of the fan, and providing a drive circuit for generating an output in dependence upon the output of the timing circuit for determining operation of the fan at either a predetermined frequency or within a predetermined range of the predetermined frequency, generating a first output from the monitoring circuit when the operation of the fan is either at the predetermined frequency or within the predetermined range of the predetermined frequency;

generating a second output from the monitoring circuit when the operation of the fan is either not at the predetermined frequency or not within the predetermined range of the predetermined frequency;

wherein the input detection circuit is AC coupled; wherein the input detection circuit outputs a low pulse to the input of the timing circuit for every tach pulse received from the tach generator and the timing circuit outputs a first output level when said low pulses from the input detection circuit occur at a predetermined frequency and the first output level from the timing circuit generates a first output from the drive circuit; and the input detection circuit outputs a high voltage level to the input of the timing circuit when no tach pulses received from the tach generator and the timing circuit outputs a second output level low when either no tach pulses are received from the tach generator or the tach pulses received from the tach generator are at a frequency below the predetermined frequency and the second output level from the timing circuit generates a second output from the drive circuit.

9. The method according to claim 8, wherein the aspect of operation of the fan is either rotation of the fan or rotation of the fan within a predetermined range of an operation frequency of the fan; and the operation frequency of the fan is either predetermined or variable.

10. The method according to claim 8, wherein the drive circuit controls whether electrical control circuitry controlling a portion of an item of equipment associated with the fan is enabled or disabled.

11. The method according to claim 8, wherein the input detection circuit is AC coupled; and the input detection circuit generates a low output pulse for each pulse received from the tach generator.

12. The method according to claim 8, wherein the input detection circuit generates an output pulse for each pulse received from the tach generator;

the timing circuit generates a predetermined output level when the output pulses from the input detection circuit occur at a predetermined frequency or within a predetermined range around the predetermined frequency; and the predetermined frequency is either predetermined or variable.

13. The method according to claim 8, wherein the first output is an output signal for enabling one or more relays such that they close; and the second output is an output signal for disabling the one or more relays such that they open.

14. The method according to claim 8, wherein the second output triggers at least one of an alarm and an electronic communication.

15. A monitoring circuit for a fan comprising:

a tach generator contained within a given cooling fan, an AC coupled tach input detection circuit, a timing circuit, and a relay drive circuit, given electronic control circuitry controlling a given piece of equipment, said electronic control circuitry capable of being enabled or disabled by said relay drive circuit, said AC coupled Tach input detection circuit outputting a low pulse to an input of said timing circuit for every tach pulse, said timing circuit outputting a high voltage level when said low pulses from said AC coupled tach input detection circuit occur at a selected frequency, and said high voltage level causing said relay control circuit to enable an output relay, said output relay enabling said electronic control circuitry, and said AC coupled tach input detection circuit outputting a high voltage level to an input of said timing circuit when no tach pulses are input to said AC coupled tach input detection circuit, said timing circuit outputting a low voltage level when said low pulses from said AC coupled tach input detection circuit occur below a selected frequency, and said low voltage level output from said timing circuit causing said relay control circuit to disable said output relay, said output relay then disabling said electronic control circuitry.

* * * * *